(12) United States Patent
Caulk

(10) Patent No.: US 7,707,363 B2
(45) Date of Patent: Apr. 27, 2010

(54) MULTI-PORT MEMORY ARCHITECTURE FOR STORING MULTI-DIMENSIONAL ARRAYS II

(75) Inventor: Robert Louis Caulk, Livermore, CA (US)

(73) Assignee: LSI Corporation, Milpitas, CA (US)

( * ) Notice: Subject to any disclaimer, the term of this patent is extended or adjusted under 35 U.S.C. 154(b) by 896 days.

(21) Appl. No.: 11/419,889

(22) Filed: May 23, 2006

(65) Prior Publication Data

US 2007/0277004 A1 Nov. 29, 2007

(51) Int. Cl.
*G06F 12/00* (2006.01)
(52) U.S. Cl. .................... 711/149; 711/5; 711/E12.003
(58) Field of Classification Search .................. 711/149, 711/5, E12.003
See application file for complete search history.

(56) References Cited

U.S. PATENT DOCUMENTS

| | | | | |
|---|---|---|---|---|
| 3,995,253 A | * | 11/1976 | Morrin et al. | 382/305 |
| 3,996,559 A | * | 12/1976 | Morrin et al. | 382/304 |
| 4,090,174 A | * | 5/1978 | Van Voorhis | 382/304 |
| 6,233,658 B1 | * | 5/2001 | Tamura | 711/150 |
| 6,604,166 B1 | * | 8/2003 | Jana et al. | 711/5 |
| 6,799,252 B1 | * | 9/2004 | Bauman | 711/149 |

\* cited by examiner

*Primary Examiner*—Matt Kim
*Assistant Examiner*—John P Fishburn
(74) *Attorney, Agent, or Firm*—Christopher P. Maiorana, PC

(57) ABSTRACT

An N-port memory architecture is disclosed that stores multi-dimensional arrays so that: (1) N contiguous elements in a row can be accessed without blocking, (2) N contiguous elements in a column can be accessed without blocking, (3) some N-element two-dimensional sub-arrays can be accessed without blocking, and (4) all N/2-element two-dimensional sub-arrays can be accessed without blocking. Second, the architecture has been modified so that the above can happen and that any element can be accessed on any data port. The architecture is particularly advantageous for loading and unloading data into the vector registers of a single-instruction, multiple-data processor, such as that used for video decoding.

20 Claims, 12 Drawing Sheets

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Memory Bank Assignment

| 1 | 2 | 3 | 4 | 5 | 6 | 7 | 8 |
|---|---|---|---|---|---|---|---|
| 5 | 6 | 7 | 8 | 1 | 2 | 3 | 4 |
| 7 | 8 | 1 | 2 | 3 | 4 | 5 | 6 |
| 3 | 4 | 5 | 6 | 7 | 8 | 1 | 2 |
| 8 | 1 | 2 | 3 | 4 | 5 | 6 | 7 |
| 4 | 5 | 6 | 7 | 8 | 1 | 2 | 3 |
| 6 | 7 | 8 | 1 | 2 | 3 | 4 | 5 |
| 2 | 3 | 4 | 5 | 6 | 7 | 8 | 1 |

Figure 7a

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Memory Bank Assignment

| 1 | 2 | 3 | 4 | 5 | 6 | 7 | 8 |
|---|---|---|---|---|---|---|---|
| 5 | 6 | 7 | 8 | 1 | 2 | 3 | 4 |
| 7 | 8 | 1 | 2 | 3 | 4 | 5 | 6 |
| 3 | 4 | 5 | 6 | 7 | 8 | 1 | 2 |
| 8 | 1 | 2 | 3 | 4 | 5 | 6 | 7 |
| 4 | 5 | 6 | 7 | 8 | 1 | 2 | 3 |
| 6 | 7 | 8 | 1 | 2 | 3 | 4 | 5 |
| 2 | 3 | 4 | 5 | 6 | 7 | 8 | 1 |

Figure 7b

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Memory Bank Assignment

| 1 | 2 | 3 | 4 | 5 | 6 | 7 | 8 |
|---|---|---|---|---|---|---|---|
| 5 | 6 | 7 | 8 | 1 | 2 | 3 | 4 |
| 7 | 8 | 1 | 2 | 3 | 4 | 5 | 6 |
| 3 | 4 | 5 | 6 | 7 | 8 | 1 | 2 |
| 8 | 1 | 2 | 3 | 4 | 5 | 6 | 7 |
| 4 | 5 | 6 | 7 | 8 | 1 | 2 | 3 |
| 6 | 7 | 8 | 1 | 2 | 3 | 4 | 5 |
| 2 | 3 | 4 | 5 | 6 | 7 | 8 | 1 |

Figure 7c

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Memory Bank Assignment

| 1 | 2 | 3 | 4 | 5 | 6 | 7 | 8 |
|---|---|---|---|---|---|---|---|
| 5 | 6 | 7 | 8 | 1 | 2 | 3 | 4 |
| 7 | 8 | 1 | 2 | 3 | 4 | 5 | 6 |
| 3 | 4 | 5 | 6 | 7 | 8 | 1 | 2 |
| 8 | 1 | 2 | 3 | 4 | 5 | 6 | 7 |
| 4 | 5 | 6 | 7 | 8 | 1 | 2 | 3 |
| 6 | 7 | 8 | 1 | 2 | 3 | 4 | 5 |
| 2 | 3 | 4 | 5 | 6 | 7 | 8 | 1 |

Figure 7d

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Memory Bank Assignment

| 1 | 2 | 3 | 4 | 5 | 6 | 7 | 8 |
|---|---|---|---|---|---|---|---|
| 5 | 6 | 7 | 8 | 1 | 2 | 3 | 4 |
| 7 | 8 | 1 | 2 | 3 | 4 | 5 | 6 |
| 3 | 4 | 5 | 6 | 7 | 8 | 1 | 2 |
| 8 | 1 | 2 | 3 | 4 | 5 | 6 | 7 |
| 4 | 5 | 6 | 7 | 8 | 1 | 2 | 3 |
| 6 | 7 | 8 | 1 | 2 | 3 | 4 | 5 |
| 2 | 3 | 4 | 5 | 6 | 7 | 8 | 1 |

Figure 8

Matrix Elements

| 0,0 | 1,0 | 2,0 | 3,0 | 4,0 | 5,0 | 6,0 | 7,0 |
|---|---|---|---|---|---|---|---|
| 0,1 | 1,1 | 2,1 | 3,1 | 4,1 | 5,1 | 6,1 | 7,1 |
| 0,2 | 1,2 | 2,2 | 3,2 | 4,2 | 5,2 | 6,2 | 7,2 |
| 0,3 | 1,3 | 2,3 | 3,3 | 4,3 | 5,3 | 6,3 | 7,3 |
| 0,4 | 1,4 | 2,4 | 3,4 | 4,4 | 5,4 | 6,4 | 7,4 |
| 0,5 | 1,5 | 2,5 | 3,5 | 4,5 | 5,5 | 6,5 | 7,5 |
| 0,6 | 1,6 | 2,6 | 3,6 | 4,6 | 5,6 | 6,6 | 7,6 |
| 0,7 | 1,7 | 2,7 | 3,7 | 4,7 | 5,7 | 6,7 | 7,7 |

Logical Memory Address

| x+0 | x+1 | x+2 | x+3 | x+4 | x+5 | x+6 | x+7 |
|---|---|---|---|---|---|---|---|
| x+8 | x+9 | x+10 | x+11 | x+12 | x+13 | x+14 | x+15 |
| x+16 | x+17 | x+18 | x+19 | x+20 | x+21 | x+22 | x+23 |
| x+24 | x+25 | x+26 | x+27 | x+28 | x+29 | x+30 | x+31 |
| x+32 | x+33 | x+34 | x+35 | x+36 | x+37 | x+38 | x+39 |
| x+40 | x+41 | x+42 | x+43 | x+44 | x+45 | x+46 | x+47 |
| x+48 | x+49 | x+50 | x+51 | x+52 | x+53 | x+54 | x+55 |
| x+56 | x+57 | x+58 | x+59 | x+60 | x+61 | x+62 | x+63 |

MULTI-PORT MEMORY ARCHITECTURE FOR STORING MULTI-DIMENSIONAL ARRAYS II

FIELD OF THE INVENTION

The present invention relates to digital systems design in general, and, more particularly, to the architecture of a multi-port memory.

BACKGROUND OF THE INVENTION

FIG. 1 depicts a block diagram of a multi-processor and a multi-port memory. In general, the fact that the multi-processor comprises a plurality of execution units causes it to actually or virtually access more than one word within the memory at a time. There are three well-known memory architectures in the prior art for doing so.

In accordance with the first architecture, a full N-port design is employed that allows any N memory locations to be accessed from any port without blocking. The full N-port design is the fastest of the multi-port architectures, but is also the largest.

In accordance with the second architecture, a single-port memory with contention resolution is employed that functions as a single-server, multi-queue system. The single-port memory with contention resolution is the slowest of the multi-port architectures, but is also the smallest.

In accordance with the third architecture, a plurality of independent memory banks with contention resolution are employed. So long as each processor seeks data in a different memory bank, there is no contention. In contrast, when two processors seek data in the same memory bank, there is contention and one of them has to wait. An advantage of the third architecture is that its speed and size are a function of the number of memory banks used, and, therefore, its space-time parameters can be tailored for the application. For example, when the third architecture has a large number of memory banks, its speed and size approach that of the full N-port design, but when the third architecture has only 2 memory banks, it's speed and size approach that of the single-port memory.

FIG. 2 depicts a graph of the space-time parameters for three multi-port architectures in the prior art.

Although the three principal architectures provide a variety of space-time parameters, there are special-purpose applications that need a multi-port architecture with better space-time parameters than are exhibited by architectures in the prior art.

SUMMARY OF THE INVENTION

The present invention is an N-port memory architecture that is faster than a traditional N-bank memory bank architecture and smaller than a full N-port design. This is accomplished by recognizing that there are special-purpose applications where the traditional N-bank memory bank architecture can be enhanced to provide almost the same speed as the full N-port design. One of these applications has to do with the storage of multi-dimensional arrays.

The illustrative embodiment is an memory bank architecture that has been enhanced in two ways. First, the architecture has been modified to store multi-dimensional arrays so that: (1) N contiguous elements in a row can be accessed without blocking, (2) N contiguous elements in a column can be accessed without blocking, (3) some N-element multi-dimensional sub-arrays can be accessed without blocking, and (4) all N/2-element multi-dimensional sub-arrays can be accessed without blocking. This is advantageous in system designs that handle multi-dimensional arrays, such as video decoding systems, etc.

Second, the architecture has been modified so that the above can happen and that any element can be read from, and written to, on any data port. This is particularly advantageous for loading and unloading data into the vector registers of a single-instruction, multiple-data processor, such as that used for video decoding.

The illustrative embodiment comprises: (i) A address ports, wherein A is a positive integer greater than one; (ii) D data ports, wherein D is a positive integer greater than one; (iii) N independent memory banks, wherein N is a positive integer greater than one; (iv) an address switch for routing addresses on said address ports to said memory banks, wherein said routing is based, at least in part, on said addresses; and (v) a data switch for routing data between said data ports and said memory banks, wherein said routing is based, at least in part, on (1) said addresses, and (2) which of said addresses is on which of said address ports.

BRIEF DESCRIPTION OF THE DRAWINGS

FIG. 7a depicts a mapping of the elements in a multi-dimensional array to memory banks.

FIG. 7b depicts how N contiguous elements of a the first column are all stored in different memory banks, and, therefore, can be read without contention.

FIG. 7c depicts how N contiguous elements in the third row are all stored in different memory banks, and, therefore, can be read without contention.

FIG. 7d depicts how a subarray of N/2 contiguous elements—elements (3,2), (4,2), (3,3), and (4,3)—are all stored in different memory banks, and, therefore, can be read without contention.

FIG. 8 depicts a mapping of multi-dimensional array elements to logical addresses.

DETAILED DESCRIPTION

Figure 1:
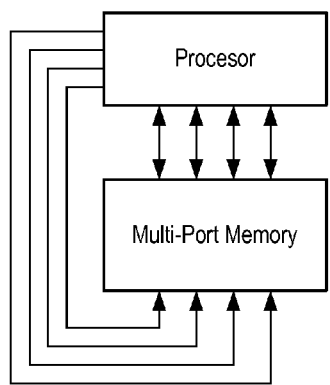
FIG. 1 depicts a block diagram of a multi-processor and a multi-port memory.
Figure 2:
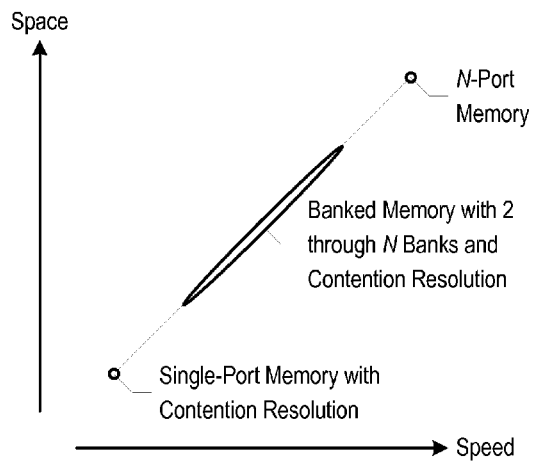
FIG. 2 depicts a graph of the space-time complexity for three multi-port architectures in the prior art.
Figure 3:
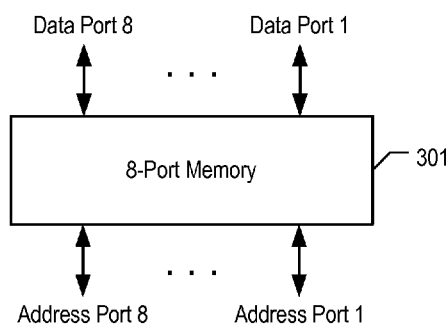
FIG. 3 depicts a block diagram of an N-port memory in accordance with the illustrative embodiment of the present invention in which N=8.

FIG. 3 depicts a block diagram of an N-port memory in accordance with the illustrative embodiment of the present invention in which N=8. It will be clear to those skilled in the art, after reading this specification, how to make and use alternative embodiments of the present invention for any value in which N is a positive integer.

Memory 301 comprises N=8 data ports and N=8 address ports. A word can be read from or written to memory 301 on a data port independently of whether a word is read from or written to memory 301 on another port. In other words, any combination of N=8 words can be read from and written into memory 301 in one cycle. For example, a word can be written into memory 301 on data ports 1, 6, and 8, while words are read from memory 301 on data ports 2, 3, 4, 5, and 7. In all cases, the data on port n, wherein n∈{1, 2, . . . , N}, is associated with the address on address port n.

Figure 4:
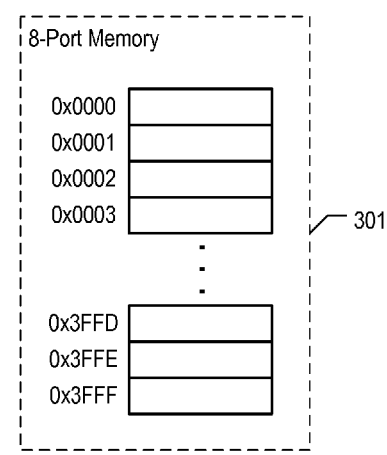
FIG. 4 depicts a block diagram of the logical structure of memory 301, which is of a linear memory with P memory locations identified by addresses 0 through P−1, wherein P is a positive integer greater than 1.

FIG. 4 depicts a block diagram of the logical structure of memory 301, which is a linear memory with P memory locations identified by addresses 0 through P−1, and wherein P is a positive integer greater than 1. In accordance with the illustrative embodiment, $P=16,384=0\text{x}3\text{FFF}=2^{14}$, but it will be clear to those skilled in the art how to make and use alternative embodiments of the present invention for any value of P. So although memory 301 has multiple ports, the reading of an address on one address port yields the same data as on another port because they both refer to the same logical memory location.

Figure 5:
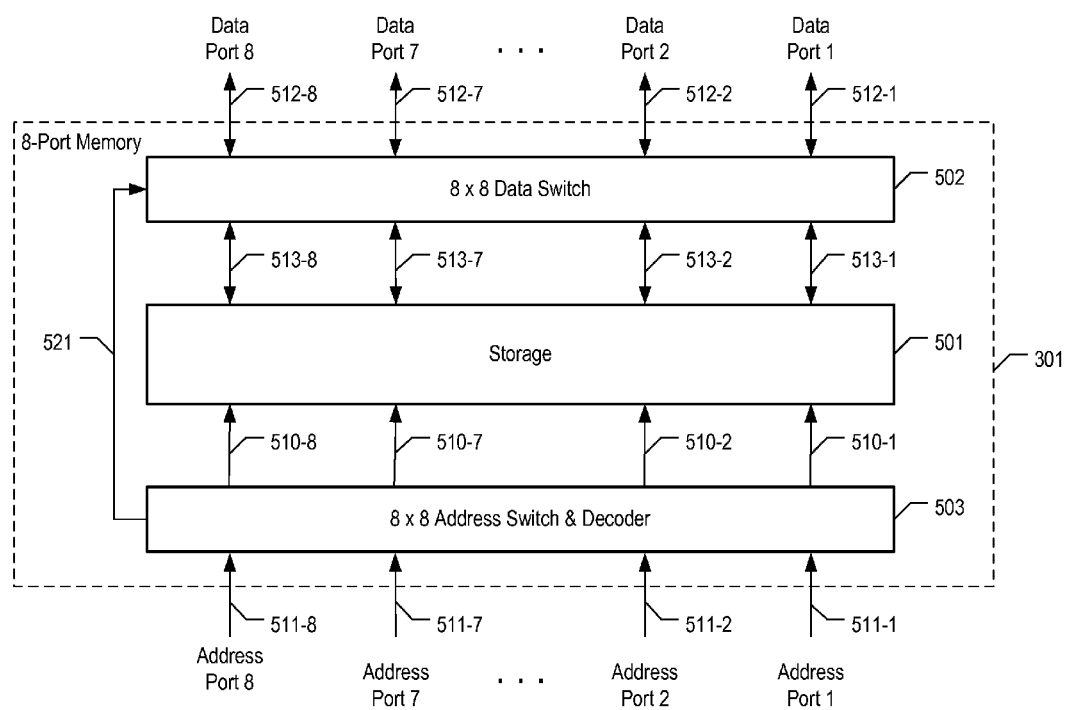
FIG. 5 depicts a block diagram of the salient components of memory 301, which comprises storage 501, N=8×N=8 data switch 502, and N=8×N=8 address switch and decoder 503, interconnected as shown.

FIG. 5 depicts a block diagram of the salient components of memory 301, which comprises storage 501, N=8×N=8 data switch 502, and N=8×N=8 address switch and decoder 503, interconnected as shown.

Storage 501 comprises P memory locations, N address ports, 510-1 through 510-8, and N data ports, 513-1 through 513-8. In accordance with the illustrative embodiment, each logical memory location corresponds to only one of the address ports 510-1 through 510-8 and one of the data ports 513-1 through 513-8.

The constraint that each logical memory location in memory 501 corresponds to only one of the address ports 510-1 through 510-8 means that a logical address on one of address ports 511-1 through 511-8 must be routed to the correct one of address ports 510-1 through 510-8. This is the function performed by address switch and decoder 503. In other words, address switch and decoder 503 must:

i. decode each logical address on each of address ports 511-1 through 511-8,
ii. generate a physical memory address in storage 501 that corresponds to that logical address, and
iii. route the physical address to the appropriate one of address ports 510-1 through 510-8.

In accordance with the illustrative embodiment, address switch and decoder 503 comprises an N×N non-blocking crossbar switch, but it will be clear to those skilled in the art, after reading this specification, how to make and use alternative embodiments of the present invention in which another structure provides the requisite functionality.

The shuffling of addresses between address ports 511-1 through 511-8 and address ports 510-1 through 510-8, without more, destroys the isomorphic relationship in which the data on port 512-*n* is associated with the address on address port 511-*n*. To preserve this relationship, data switch 502 performs the inverse shuffle of address switch and decoder 503. For example, if logical address 0x0000 is presented on address port 511-3 during a read operation, the data in logical address 0x0000 should appear on data port 512-3. But within memory 301, address switch and decoder 503 might route the corresponding physical address to address port 510-1 which would cause the desired word to emerge on data port 513-1. To ensure that the word emerges on data port 512-3, data switch 513 routes the word from data port 513-1 to 512-3.

In accordance with the illustrative embodiment, data switch 502 is an N×N non-blocking crossbar switch, but it will be clear to those skilled in the art, after reading this specification, how to make and use alternative embodiments of the present invention in which another structure provides the requisite functionality.

There is another advantage to the combination of address switch and decoder 503 and data switch 502 and that is that it enables the word at any logical address to be read from, or written to, any of data ports 512-1 through 512-8. This is particularly advantageous when, for example, memory 301 is used to load and unload the vector registers in a single-instruction, multiple-data processor.

Figure 6:
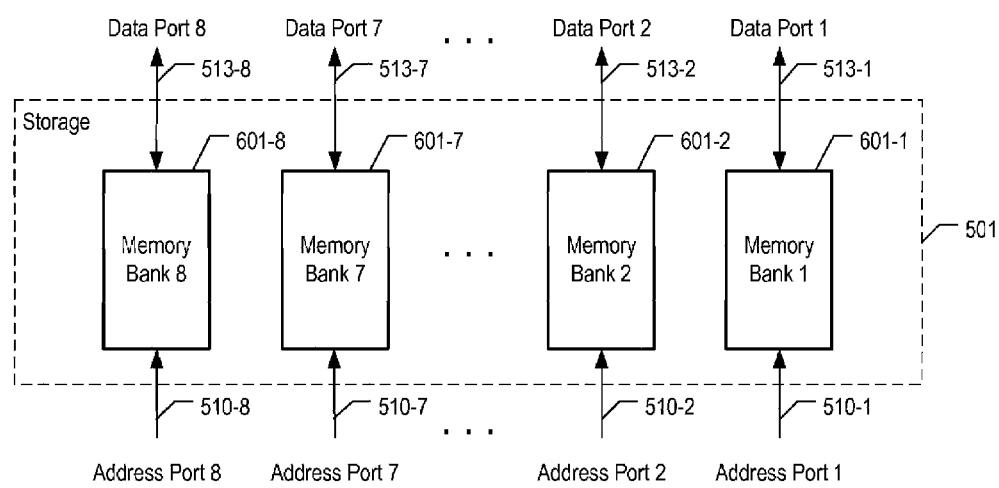
FIG. 6 depicts a block diagram of the salient components of storage 501, which comprises N=8 independent memory banks 501-1 through 501-8.

FIG. 6 depicts a block diagram of the salient components of storage 501, which comprises N=8 independent memory banks 601-1 through 601-8. Each memory bank is a single-port memory that comprises $P/N=2^{13}=2048$ words. Because storage 501 comprises independent memory banks only one word from each memory bank can be read or written to in a single cycle.

Although the worst-case contention situation cannot be eliminated the average-case can be by distributing words that are often accessed together across different memory banks. There are special-purpose applications where group of words are often accessed together and one of those applications involves the storage of multi-dimensional arrays, such as those commonly manipulated in video coding and coding (e.g., H.264, MPEG, etc.). For example, in video decoding, the elements in a row, a column, and a contiguous block tend to be accessed far more frequently together than random elements in the array.

In accordance with the illustrative embodiment, each element of a J×K two-dimensional array, wherein J and K are both positive integers greater than 1, is assigned to one of the memory banks so that three conditions are satisfied:

i. the coordinates for N contiguous elements in a row of the two-dimensional array decode into different memory banks; and
ii. the coordinates for N contiguous elements in a column of the two-dimensional array decode into different memory banks; and
iii. the coordinates for the elements in an L by M two-dimensional subarray of the two-dimensional array decode into different memory banks, wherein L and M are both positive integers, $1 \leq L \leq J$, $1 \leq M \leq K$, and $2 \leq L*M \leq N/2$.

It will be clear to those skilled in the art, after reading this disclosure, how to generate any of the many suitable mappings between array coordinates and memory banks—and one illustrative mapping is depicted in FIG. 7*a*.

FIG. 7*b* depicts how N contiguous elements of a the first column are all stored in different memory banks, and, therefore, can be read without contention. The reader can verify that the same is true for all columns.

FIG. 7*c* depicts how N contiguous elements in the third row are all stored in different memory banks, and, therefore, can be read without contention. The reader can verify that the same is true for all columns.

FIG. 7*d* depicts how a subarray of N/2 contiguous elements—elements (3,2), (4,2), (3,3), and (4,3)—are all stored in different memory banks, and, therefore, can be read without contention. The reader can verify that the same is true for all subarrays of N/2 contiguous elements.

Figure 7E:
FIG. 7e depicts how some, but not all, subarrays of N contiguous elements are stored in different memory banks, and, therefore, can be read without contention.

FIG. 7e depicts how some, but not all, subarrays of N contiguous elements are stored in different memory banks, and, therefore, can be read without contention. The reader can verify that the same is true for some, but not all, subarrays of N contiguous elements.

One corollary of the above constraints is that, in accordance with the Pigeon Hole Principal, at least two coordinates for any N+1 elements decode into the same memory bank.

In accordance with the illustrative embodiment, each element of a J×K two-dimensional array is assigned a logical address in, for example, row-column order as depicted in FIG. 8. It will be clear to those skilled in the art how to assign the elements to logical addresses in accordance with a different, but suitable, scheme.

In addition, address switch and decoder 503 comprises logic for decoding each of the addresses into:
  i. a memory bank, and
  ii. a unique physical address into that memory bank so that the following three conditions are satisfied:
  i. addresses $p+(c-1)$ decode into different memory banks for all p and all c, wherein $0 \leq p+(c-1) < P$, wherein p is a positive integer and $p \in \{0, \ldots, P-1\}$, wherein c is a positive integer and $c \in \{1, \ldots, C\}$, and wherein C is a positive integer and $C \leq N$; and
  ii. addresses $p+N(r-1)$ decode into different memory banks for all p and all r, wherein $0 \leq p+N(r-1) < P$, wherein r is a positive integer and $r \in \{1, \ldots R\}$, and wherein R is a positive integer and $R \leq N$; and
  iii. addresses $p+(c-1)+N(r-1)$ decode into different memory banks for all p, all c, and all r, wherein $0 \leq p+(c-1)+N(r-1) < P$, and wherein $1 \leq C*R \leq N/2$.

Figure 9:
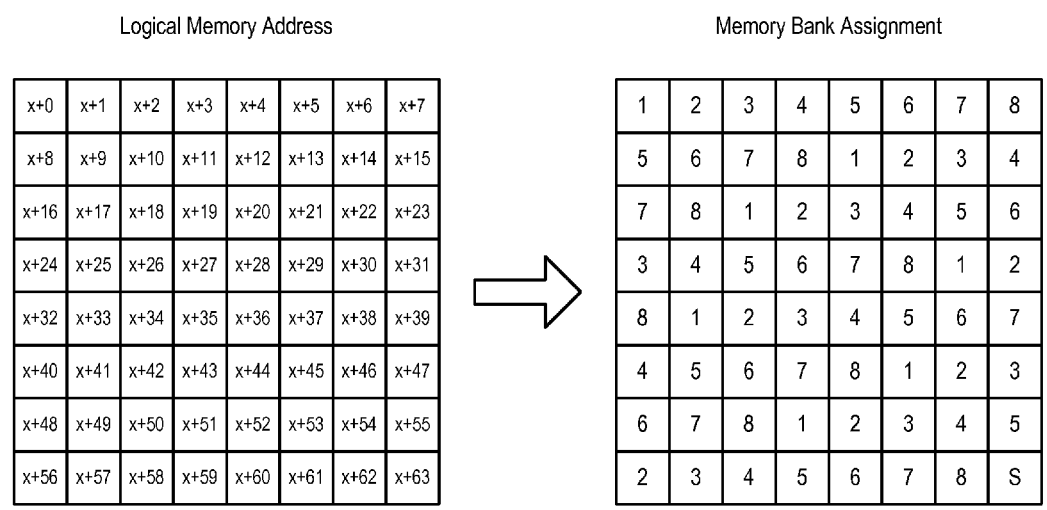
FIG. 9 depicts a mapping of logical addresses to memory banks.

The result will be a mapping of logical addresses to memory banks, such as that depicted in FIG. 9.

Here too, because there are only N memory banks, the Pigeon Hole Principal holds—at least two addresses in every set of N+1 addresses decode into the same memory bank.

Figure 10:
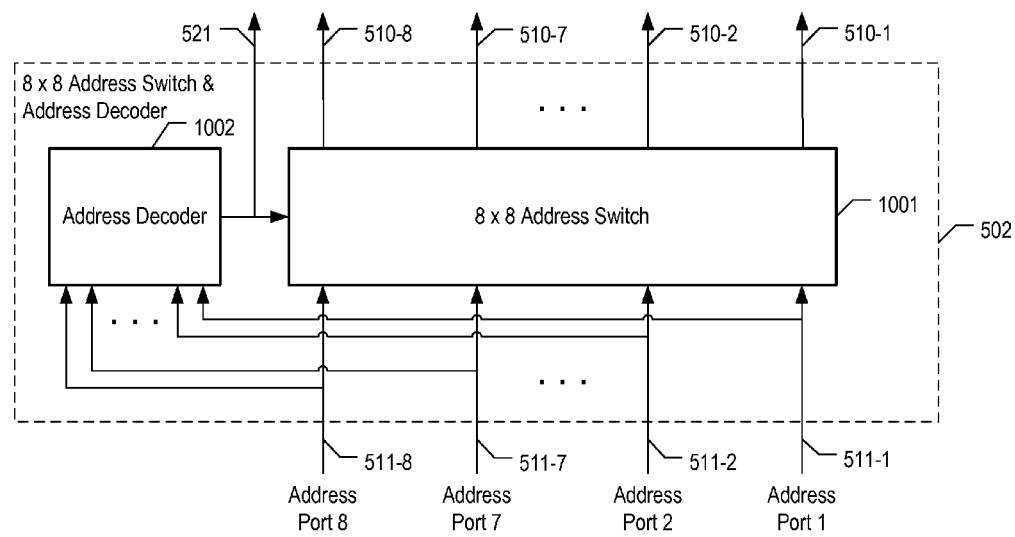
FIG. 10 depicts a block diagram of the salient components of address switch and decoder 502, which comprises N=8× N=8 address switch 1001 and address decoder 1002.

FIG. 10 depicts a block diagram of the salient components of address switch and decoder 502, which comprises N=8× N=8 address switch 1001 and address decoder 1002.

Address switch 1001 is combinational logic that receives a P-bit logical address on each of address ports 511-1 through 511-8 and that outputs a ($\log_2 P - \log_2 N$)-bit physical address on each of address ports 510-1 through 510-8. Address switch 1001 shuffles the addresses under the control of address decoder 1002 using a non-blocking cross-bar switch, but performs the logical address to physical memory address translation on its own so that each P-bit logical address assigned to a single memory bank generates a unique ($\log_2 P - \log_2 N$)-bit physical address. It will be clear to those skilled in the art how to accomplish this.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
  N memory banks addressable by N intermediate signals, wherein N is at least two and each of said memory banks (i) receives a respective one of said intermediate signals and (ii) has a plurality of memory locations;
  an address switch configured to (i) generate said intermediate signals by routing N addresses signals in response to a control signal, each of said address signals conveying a respective one of a plurality of address values, each of said address values corresponding to a respective one of said memory locations and (ii) generate said control signal in response to all of said address signals; and
  a data switch configured to route N data signals between N data ports and said memory banks in response to said control signal.

2. The apparatus of claim 1, wherein said address values range from 0 through P-1 and said routing through said address switch at a given time is non-blocking if (1) for a given value of $p \in \{0, \ldots, P-1\}$ where p is a positive integer, (2) a given value of C where C is a positive integer and $C \leq N$ and (3) a given value of R where R is a positive integer and $R \leq N$:
  (i) all combinations, as c varies, of said address values $p+(c-1)$ in said address signals satisfy $0 \leq p+(c-1) < P$, where c is a positive integer and $c \in \{1, \ldots, C\}$ and;
  (ii) all combinations, as r varies, of said address values $p+N(r-1)$ in said address signals satisfy $0 \leq p+N(r-1) < P$, where r is a positive integer and $r \in \{1, \ldots, R\}$; and
  (iii) all combinations, as c and r vary, of said address values $p+(c-1)+N(r-1)$ in said address signals satisfy $0 \leq p+(c-1)+N(r-1) < p$, where $1 \leq C*R \leq N/2$.

3. The apparatus of claim 1, wherein said address switch comprises an N×N non-blocking crossbar switch.

4. The apparatus of claim 1, wherein said address values range from 0 through P-1 and (i) for a given value of $p \in \{0, \ldots, P-1\}$ where p is a positive integer, (ii) a given value of C where C is a positive integer and (iii) a given value of R where R is a positive integer, said routing through said address switch at any given time is blocking, as c and r vary, to at least one combination of said address values $p+(c-1)+N(r-1)$ in said address signals that satisfy $C*R > N/2$, where c is a positive integer, $c \in \{1, \ldots, C\}$, r is a positive integer and $r \in \{1, \ldots, R\}$.

5. The apparatus of claim 1, wherein said address values range from 0 through P-1 and (i) for a given value of $p \in \{0, \ldots, P-1\}$ where p is a positive integer and (ii) a given value of R where R is a positive integer, said routing through said data switch at any given time is blocking, as r varies, to at least one combination of said address values $p+N(r-1)$ in said address signals that satisfy $R > N$, where r is a positive integer and $r \in \{1, \ldots, R\}$.

6. The apparatus of claim 1, wherein said address values range from 0 through P-1 and (i) for a given value of $p \in \{0, \ldots, P-1\}$ where p is a positive integer and (ii) a given value of C where C is a positive integer, said routing through said data switch, as c varies, at any given time is blocking to at least one combination of said address values $p+(c-1)$ in said address signals that satisfy $C > N$, where c is a positive integer and $c \in \{1, \ldots, C\}$.

7. The apparatus of claim 1, wherein said data switch comprises an N×N non-blocking crossbar switch.

8. The apparatus of claim 3, wherein (i) said address switch further comprises a decoder circuit configured to generate said control signal and (ii) said N×N non-blocking crossbar switch is responsive to said control signal.

9. The apparatus of claim 1, wherein said address values range from 0 to P-1 and said address switch is further configured to generate said intermediate signals with a plurality of intermediate values, each of said intermediate values having $\log_2 P - \log_2 N$ bits.

10. The apparatus of claim 1, wherein (i) said memory locations in each of said memory banks range from a first location to a last location and (ii) a first of said address values of a first of said address signals accesses said first location in a first of said memory banks while in parallel a second of said address values of a second of said address signals accesses a second of said memory locations in a second of said memory banks.

11. A method of data storage access, comprising the steps of:
   (A) addressing N memory banks with N intermediate signals, wherein N is at least two and each of said memory banks (i) receives a respective one of said intermediate signals and (ii) has a plurality of memory locations;
   (B) generating said intermediate signals by routing N address signals through an address switch circuit in response to a control signal, each of said address signals conveying a respective one of a plurality of address values, each of said address values corresponding to a respective one of said memory locations;
   (C) generating said control signal in response to all of said address signals; and
   (D) routing N data signals through a data switch circuit between N data ports and said memory banks in response to said control signal.

12. The method of claim 11, wherein said address values range from 0 through P−1 and said routing through said address switch circuit at a given time is non-blocking if (1) for a given value of $p \in \{0, \ldots, P-1\}$ where p is a positive integer, (2) a given value of C where C is a positive integer and $C \leq N$ and (3) a given value of R where R is a positive integer and $R \leq N$:
   (i) all combinations, as c varies, of said address values $p+(c-1)$ in said address signals satisfy $0 \leq p+(c-1) < P$, where c is a positive integer and $c \in \{1, \ldots, C\}$; and
   (ii) all combinations, as r varies, of said address values $p+N(r-1)$ in said address signals satisfy $0 \leq p+N(r-1) < P$, where r is a positive integer $r \in \{1, \ldots, R\}$; and
   (iii) all combinations, as c and r vary, of said address values $p+(c-1)+N(r-1)$ in said address signals satisfy $0 \leq p+(c-1)+N(r-1) < p$, where $1 \leq C*R \leq N/2$.

13. The method of claim 11, wherein said routing of said address signals comprises an N×N non-blocking crossbar routing.

14. The method of claim 11, wherein said address values range from 0 through P−1 and (i) for a given value of $p \in \{0, \ldots, P-1\}$ where p is a positive integer, (ii) a given value of C where C is a Positive integer and (iii) a given value of R where R is a positive integer, said routing through said address switch circuit at any given time is blocking, as c and r vary, to at least one combination of said address values $p+(c-1)+N(r-1)$ in said address signals that satisfy $C*R > N/2$, where c is a positive integer, $c \in \{1, \ldots, C\}$, r is a positive integer and $r \in \{1, \ldots, R\}$.

15. The method of claim 11, wherein said address values range from 0 through P−1 and (i) for a given value of $p \in \{0, \ldots, P-1\}$ where p is a positive integer and (ii) a given value of R where R is a positive integer, said routing through said data switch circuit at any given time is blocking, as r varies, to at least one combination of said address values $p+N(r-1)$ in said address signals that satisfy $R > N$, where r is a positive integer and $r \in \{1, \ldots, R\}$.

16. The method of claim 11, wherein said address values range from 0 through P−1 and (i) for a given value of $p \in \{0, \ldots, P-1\}$ where p is a positive integer and (ii) a given value of C where C is a positive integer, said routing through said data switch circuit at any given time is blocking, as c varies, to at least one combination of said address values $p+(c-1)$ in said address signals that satisfy $C > N$, where c is a positive integer and $c \in \{1, \ldots, C\}$.

17. The method of claim 11, wherein said routing of said data signals comprises an N×N non-blocking crossbar routing.

18. The method of claim 13, wherein (i) said control signal is generated by a decoder circuit and (ii) said N×N non-blocking crossbar routing is responsive to said control signal.

19. The method of claim 11, wherein each of said address values range from 0 to P−1 and said intermediate signals are generated with a plurality of intermediate values, each of said intermediate values having $\log_2 P - \log_2 N$ bits.

20. An apparatus comprising:
   means for storing comprising N memory banks addressable by N intermediate signals, wherein N is at least two and each of said memory banks (i) receives a respective one of said intermediate signals and (ii) has a plurality of memory locations;
   means for address switching configured to (i) generate said intermediate signals by routing N addresses signals in response to a control signal, each of said address signals conveying a respective one of a plurality of address values, each of said address values corresponding to a respective one of said memory locations and (ii) generate said control signal in response to all of said address signals, wherein said routing of said address signals comprises a first N×N non-blocking crossbar routing; and
   means for data switching configured to route N data signals between N data ports and said means for storing in response to said control signal, wherein said routing of data signals comprises a second N×N non-blocking routing.

* * * * *